Dec. 2, 1969 — L. M. FORSTER — 3,480,985
WIPER ARM CONSTRUCTION
Filed Sept. 16, 1966
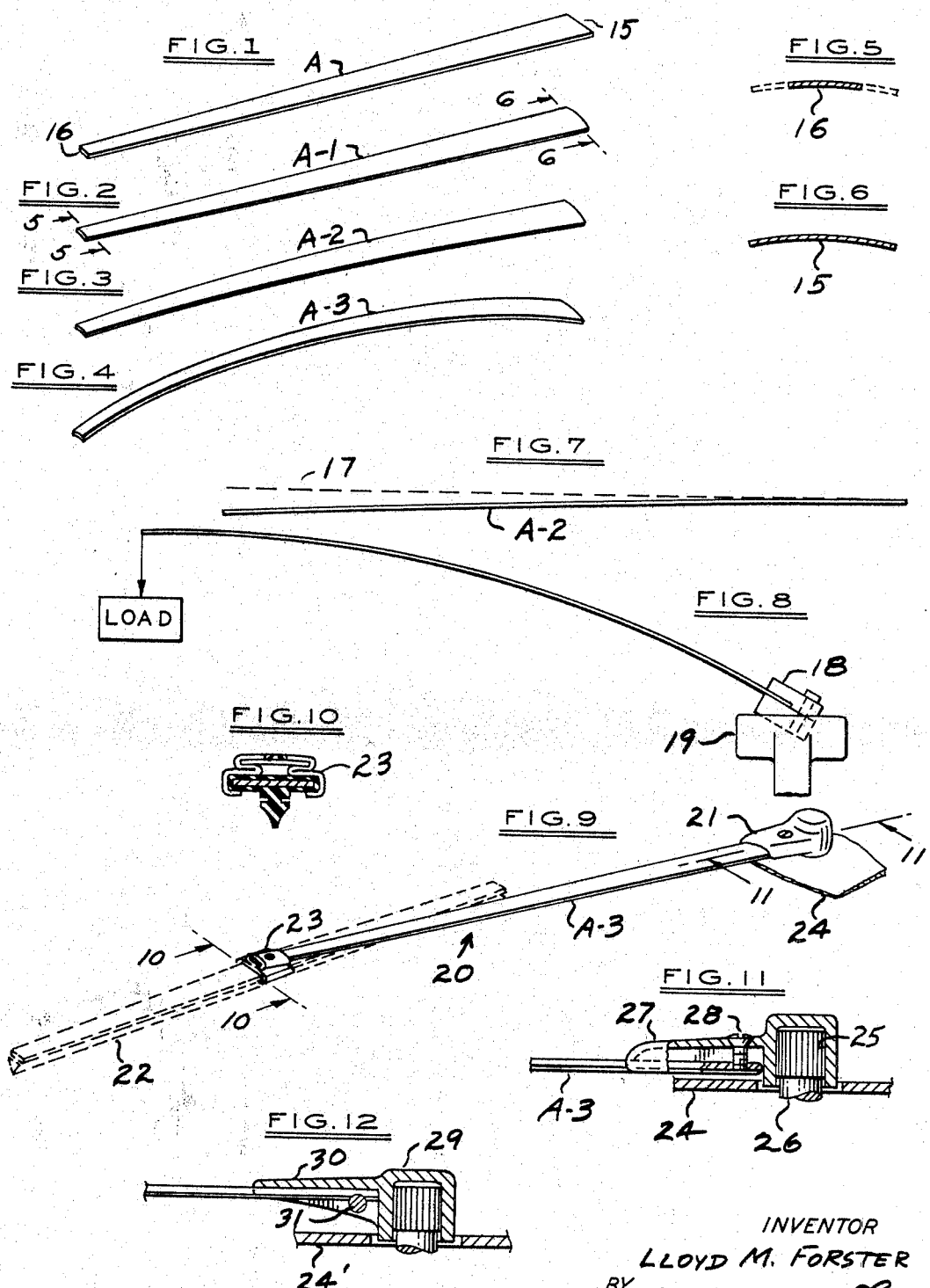
INVENTOR
LLOYD M. FORSTER
BY
Harley Forster & Farley
ATTORNEYS United States Patent Office 3,480,985
Patented Dec. 2, 1969

3,480,985
WIPER ARM CONSTRUCTION
Lloyd M. Forster, Bloomfield Hills, Mich., assignor to Forster and Slaughter
Filed Sept. 16, 1966, Ser. No. 580,038
Int. Cl. B60s 1/34
U.S. Cl. 15—250.35          10 Claims

ABSTRACT OF THE DISCLOSURE

A wiper arm construction comprising a single leaf spring having transverse curvature, tapered width and uniform thickness providing a varying, complex section modulous and having a required longitudinal operating configuration with a predetermined load applied at the remote extremity of the wiper arm from a cantilever attachment point and having a longitudinal free form curvature determined by a reverse application of the required pressure load to a similar arm having a free form longitudinal configuration corresponding to the required operating configuration.

---

This invention relates to windshield wiper arm constructions in general, and more particularly to a simple single leaf spring wiper arm construction for automotive vehicles and other uses.

Present automotive and like vehicles use a wiper arm construction which applies pressure to the center of a wiper blade assembly and which transmits motion thereto across the surface of the vehicle windshield from a power actuated hub at one end. The conventional wiper arm is essentially an enclosed sheet metal box of tapering dimension connected to a heavy rigid metal strip. Each arm is fastened to a drive means at one end, which oscillates back and forth, and it is pivotally connected to a wiper blade assembly at the other end. Within the box sectioned part is a tensioning spring which reacts between the drive hub and a fitting in a box section to exert the necessary pressure to the wiper blade for proper windshield wiping action.

Although this basic wiper arm construction has been in use for many years, with but minor changes, there are a number of objectionable aspects and limitations which are of growing concern. For example, the spring biasing mechanism, box section and projecting strip are unduly complicated and expensive to manufacture and assemble and provide a bulky and objectionably conspicuous assemblage. The frontal and side faces of the box section provides a substantial surface for wind reaction at high speeds that reduces the effective blade pressure and interferes with proper wiping action. When typical bright metal surfaces are used, sun reflection may interfere with the driver's vision.

The wiper arm construction of this invention is directed to overcome or mitigate many of the objections to present wiper arms. It includes a single, thin and relatively inconspicuous leaf spring member, by itself, crowned and formed to complement the curvature of the vehicle windshield with which used as well as to provide the necessary pressure for proper windshield wiping action. The unitary leaf spring arm is rigidly mounted on a hub, similar to those conventionally used, but capable of being recessed, to take advantage of the thin low profile of the leaf spring, and it replaces the more massive and complicated box section arm assembly, projecting rigid strip, enclosed spring mechanism and anchor fittings in their entirety.

The leaf spring wiper arm is preferaly constructed from uniform thin gauge spring steel and is tapered in width from a maximum at its hub extremity to a minimum at the wiper blade connecting end. It is formed to include a transverse and outwardly convex crown which provides increased stiffness for a thin gauge material and a compound increase in the section modulus (bending moment of inertia) along its tapered length. The latter is due in part to the increasing width and sectional depth of the wiper arm crown towards its driven or hub supported end.

The wiper arm is so constructed and mounted as to extend when in use in substantially a straight line or with a slight curvature complimenting any transverse windshield curvature. However, in its free state it is formed to include such substantial curvature as will when deflected to its operating position transmit the necessary biasing spring pressure to a wiper blade assembly for proper windshield wiping action.

These and other objects and advantages to be gained in the practice of this invention will be further understood and appreciated from the description which follows of a preferred embodiment of the invention as shown by the accompanying drawings.

In the drawings:

FIGURES 1–4 are isometric views of windshield wiper arms of this invention in different and progressive forms of construction.

FIGURES 5 and 6 are enlarged cross sectional views of the ends of the wiper arm shown in FIGURE 2 as seen in the planes of lines 5—5 and 6—6 respectively.

FIGURE 7 is a diagrammatic side view presentation of the lengthwise curvature provided to complement a vehicle windshield.

FIGURE 8 is a diagrammatic side view presentation of the lengthwise curvature, and how it is obtained for proper wiper blade biasing action.

FIGURE 9 is a perspective view of a wiper arm assembly as mounted for use on a vehicle windshield (not shown).

FIGURE 10 is a cross-sectional view through the wiper blade taken along the line 10—10 of FIGURE 9 showing an attachment clip.

FIGURE 11 is a fragmentary sectional view of the driving hub shown in FIGURE 9.

FIGURE 12 is a similar fragmentary sectional view of a modified driving hub.

The following description of the development steps in producing a prototype arm will illustrate the constructional features of this wiper arm:

The unitary leaf spring wiper arm "A" is made from thin gauge spring steel sheet metal stock preferably in the order of .035 inch thickness. It is stamped or otherwise cut to the flat shape and relative size shown in FIGURE 1; (somewhat foreshortened to better illustrate the taper provided) which may have a width in the order of ⅝ inch at its hub attachment end 15 and 5/16 inch at its wiper attachment end 16, and a length to meet the requirements of any particular vehicle windshield.

The stamping "A" is next formed as shown in FIGURE 2, and identified as A–1 to include a transverse crown extending its full length. This produces a convex surface on what will be the outer disposed side of the wiper arm in use. A substantially uniform radius of curvature is preferably provided in the crowning between the ends of the arm member as best shown in FIGURES 5 and 6. However, the smaller width at the one end 16 provides a smaller cross sectional depth and the other end 15, being wider, has a greater effecting cross sectional depth. This assures greater stiffness against bending and for drive support at the wider end, which is desirable.

Although material of uniform thickness and a crown having a relatively constant radius of curvature are shown, with respect to the preferred embodiment of this invention, it will be apreciated that variances in these two factors may be used to obtain greater or less stiffness for bending and drive as desired. For example, a thinner gauge material may be crowned more to obtain a like stiffness. Similarly, a blank which may be proportionately thicker need not be crowned as much for the same stiffness. The effect of a tapering thickness increasing towards the wider end of the arm may also be provided by changing the radius of curvature throughout its length.

The crowned arm member A–1 is next formed to include a longitudinal curvature as shown in FIGURE 3 identified as A–2. This is normally a relatively slight curvature and is only such as is necessary or desirable to match the transverse curvature of the windshield member with which a particular style of wiper blade supporting arm members will be used. The reference line 17 is used in FIGURE 7 to show the relatively slight curve provided.

The next step in providing the desired prototype arm is to form the leaf spring A–2 to include a further longitudinal curvature which will ultimately be attached to the end of the wiper arm. In doing this, it is also desired to provide a curvature which will be wholly absorbed or reduced in use so that the wiper arm will be essentially straight when in service, except for any slight curvature built in to match the curvature of the windshield.

The procedure followed to determine the required deflection curve for the wiper arm biasing force desired, is as follows:

A weight equal to such biasing pressure is suspended from the smaller end of the wiper arm member A–2; as shown by the schematic load in FIGURE 7. The larger base end held in a clamp 18 is then tilted in a vise 19 until the weighted end is tangent to a horizontal plane of reference. The curvature thus produced is recorded and duplicated in a template which is used in establishing the free-form curvature of the production arm A–3 as shown in FIGURE 4 in which the opposite biasing force of the arm when deflected to operating position in actual use will be precisely that intended and will result in the predetermined slight operating curvature corresponding to the unloaded leaf spring shown in FIGURES 3 and 7.

A similar procedure applied to the straight crowned arm of FIGURE 2, omitting any preliminary curvature as shown in FIGURE 3, will result in a perfectly straight operating arm when the same operating load is applied.

It will be appreciated that the same procedure applies for any specific design of wiper arm regardless of variations in width, thickness, crown or otherwise.

It has been found that in passing the crowned blank A–1 through forming rolls and the like to obtain the member A–2, having a curvature lengthwise, that the transverse crown is not lost or diminished materially although a reverse procedure of forming the longitudinal curvature followed by superimposing a transverse crown results in substantial elimination of the longitudinal curvature.

A working embodiment of this invention is shown in FIGURE 9 to include the windshield wiper arm and blade assembly 20. The wiper arm member A–3 is secured at its wide end to a driving hub 21 and has a wiper blade 22 attached at its smaller and outer disposed end by a suitably formed clip 23.

The hub 21 is shown as provided on the vehicle panel 24 relatively under a windshield and the wiper blade 22 as if engaging a windshield (not shown) for wiping action. The wiper arm is substantially straight since its curvature is reduced in applying the prearranged biasing force to the wiper blade and only a slight residual curvature, if any, remains corresponding to that of the windshield.

The hub 21 shown in FIGURE 11 includes a bore 25 in which the customary knurled drive shaft post 26 is received. It also includes a projecting part 27 on one side for receiving and supporting the wiper arm member A–3. The extended end of the projecting part has its underside formed to complement the crown curvature and side edges of the wide end of the wiper arm and a retaining screw 28 is provided inwardly thereof to hold the end of the arm in adjustable leverage supported drive engagement therewith.

Another drive arrangement, for the wiper arm assembly, as shown by FIGURE 12 has a hub, 29 recessed in the supporting panel 24. The projecting part 30 includes a flanged opening in the extended end thereof which matches the wide end of the wiper arm which it receives. A cross pin 31 engages the underside of the wiper arm which is simply notched for holding engagement therewith.

From the foregoing, it should be apparent that a relatively simple and inexpensive wiper arm arrangement has been provided which is not only efficient in use but is of such construction as to be ideal for its intended use. The wiper arm is narrow in width and shallow in depth so that it presents minimum wind resistance, having a tendency to lift the wiper or reduce its pressure and eliminates sun glare in the vehicle, even if bright metal finishes are used. Further, the minimal dimensions of width and depth assure a wiper arm which is essentially unobvious in use or when inactive and therefore is readily adapted to any and all vehicle styling changes that may be proposed.

Extremely thin gauge stock, in the order of .035″ has been used for an 18 inch long wiper arm, having a ⅝ to 9/16 inch width and formed to develop a 28 oz. pressure. Spring steel stock of uniform thickness has been found best for production use with the variances for bending stiffness desired provided by the crown and width taper formed in the wiper arm. However, as mentioned, a variance in thickness may also be used as a factor in the end product design.

I claim:

1. A windshield wiper arm for transmitting a predetermined movement and operating pressure from a pivotally mounted drive shaft to a windshield engaging wiper unit comprising a single substantially flexible leaf spring having a desired predetermined operating configuration, said leaf spring having a free state continuous arcuate longitudinal curvature corresponding to that produced by deflection from a reverse loading of a similar leaf spring having a free state longitudinal configuration corresponding to said desired predetermined operating configuration, and an adapter hub for attaching aid leaf spring to said drive shaft in a cantilever spring loaded condition extending substantially uniformly parallel to the lower edge of the windshield, said single leaf spring being provided with a transverse crown extending throughout its length adding rigidity thereto.

2. A windshield wiper arm as set forth in claim 1 wherein said windshield wiper arm is required to exert said operating pressure at a single substantially central point of attachment to said wiper unit.

3. A windshield wiper arm as set forth in claim 2 wherein said reverse load is applied at a corresponding single point on said wiper arm in a direction normal to the fully deflected end at said single point.

4. A windshield wiper arm as set forth in claim 3 having its width tapered to a minimum at said single point.

5. A windshield wiper arm as set forth in claim 1 wherein said crown comprises a substantially uniform circular arc.

6. A windshield wiper arm as set forth in claim 5 wherein said leaf spring has a substantially uniform thickness.

7. A windshield wiper arm as set forth in claim 1 wherein said desired predetermined operating configuration extends along a substantially straight line.

8. A windshield wiper arm as set forth in claim 1, said adapter including a flanged extension for engaging the side edges of said leaf spring,

9. A windshield wiper arm as set forth in claim 1, said adapter including a flanged extension for engaging the side edges of said leaf spring and an attachment screw for adjusting the extension angle of said leaf spring within said flanged extension.

10. A windshield wiper arm as set forth in claim 1, said adapter including a flanged extension for engaging the side edges of said leaf spring, and a transverse pin extending between the flanges of said extension for reactively engaging the end of said leaf spring.

References Cited

UNITED STATES PATENTS

| | | | |
|---|---|---|---|
| 1,920,730 | 8/1933 | Wiseman | 15—250.35 XR |
| 2,733,472 | 2/1956 | Karstens et al. | 15—250.36 XR |
| 3,387,316 | 6/1968 | Pearse | 15—250.35 XR |
| 1,573,618 | 2/1926 | Laganke | 15—250.35 |
| 2,539,219 | 1/1951 | Abdelnour | 15—250.32 X |
| 2,598,971 | 6/1952 | Carey | 15—250.34 X |
| 2,613,385 | 10/1952 | Wylie | 15—250.35 X |
| 3,156,940 | 11/1964 | Anderson | 15—250.42 |

FOREIGN PATENTS 1,217,680   12/1959   France.

PETER FELDMAN, Primary Examiner

U.S. Cl. X.R.

15—250.34